United States Patent [19]
Reaver et al.

[11] Patent Number: 5,207,018
[45] Date of Patent: May 4, 1993

[54] COMBINATION FLY SWATTER AND INSECT TRAP

[76] Inventors: Robert R. Reaver; Carol Reaver, both of 1643 Avenida Loma Vista, San Dimas, Calif. 91773

[21] Appl. No.: 830,382

[22] Filed: Feb. 3, 1992

[51] Int. Cl.⁵ ............................ A01M 3/00; A01M 3/02
[52] U.S. Cl. ............................................. 43/137; 43/134
[58] Field of Search ............................ 43/134, 137, 139

[56] References Cited

U.S. PATENT DOCUMENTS

| | | | |
|---|---|---|---|
| 499,722 | 6/1893 | Edge | 43/134 |
| 1,081,364 | 12/1913 | Chapman | 43/137 |
| 1,179,303 | 4/1916 | Hanlon | 43/137 |
| 1,462,416 | 7/1923 | McDermott | 43/134 |
| 1,604,460 | 10/1926 | Marlow . | |
| 3,494,067 | 2/1970 | Potrzuski . | |
| 3,659,374 | 5/1972 | Steves | 43/134 |
| 4,120,114 | 10/1978 | Little | 43/137 |
| 4,132,027 | 1/1979 | Malacheski | 43/134 |
| 4,174,586 | 11/1979 | Burzdak . | |
| 4,272,906 | 6/1981 | Liebling . | |
| 4,324,062 | 4/1982 | Schneider . | |
| 4,759,150 | 7/1988 | Pierce | 43/137 |

FOREIGN PATENT DOCUMENTS

| | | | |
|---|---|---|---|
| 3926573 | 3/1990 | Fed. Rep. of Germany | 43/137 |
| 533116 | 3/1921 | France | 43/137 |
| 908392 | 10/1962 | United Kingdom | 43/134 |

*Primary Examiner*—Kurt C. Rowan
*Attorney, Agent, or Firm*—Kelly, Bauersfeld & Lowry

[57] ABSTRACT

A hand held fly swatter apparatus is provided which is capable of being configured to capture insects alive from given surfaces to allow their subsequent disposal. The apparatus includes a flexible handle having a transparent rigid housing attached to a front end thereof. The housing defines an insect trap compartment having a large aperture through which an insect is placed within the insect trap compartment. The housing provides a pair of parallel channels which extend along opposite sides of the compartment aperture and are arranged to support a front end portion of a mesh closure member. The mesh closure member is slidable between a retracted position to permit access to the insect trap compartment, and an extended position wherein the mesh closure member covers the compartment aperture. A rear slide clamp attached to a rear end portion of the mesh closure member supports the closure member relative to the handle. Bumpers are provided to limit movement of the mesh closure member between the defined retracted and extended positions. The housing and the mesh closure member, in its extended position, cooperatively provide a fly swatter.

19 Claims, 1 Drawing Sheet

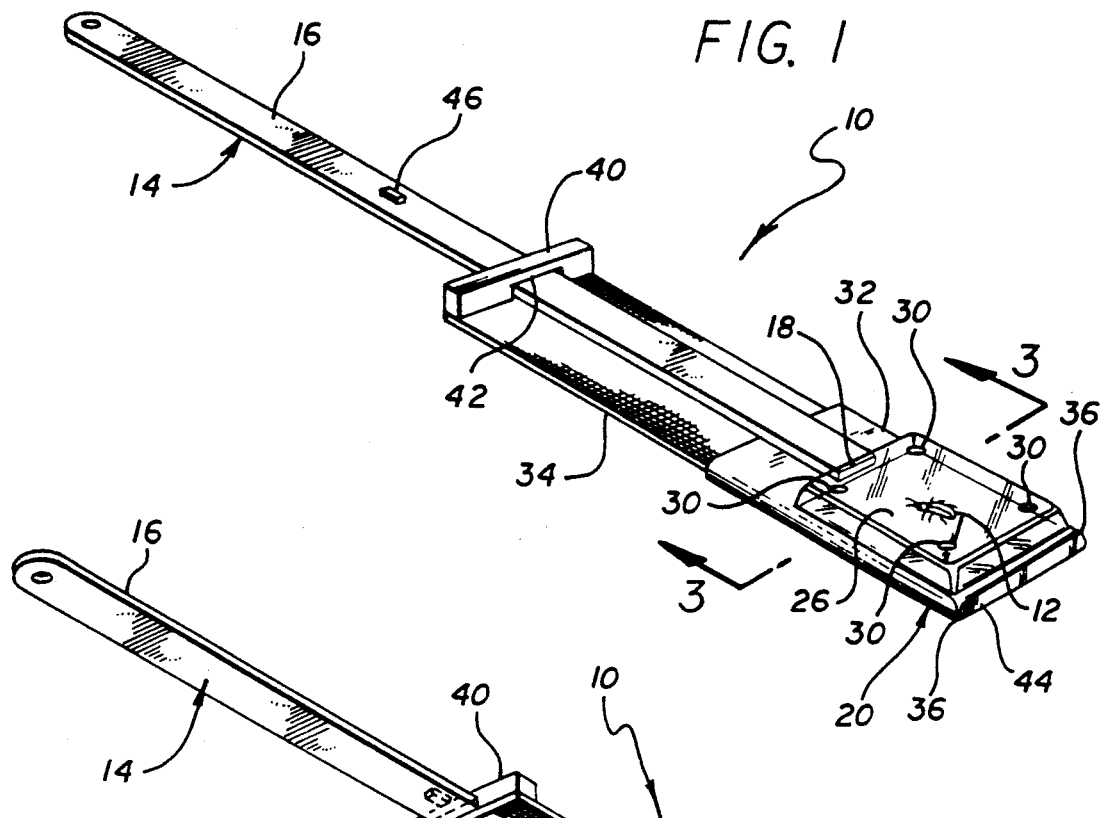
FIG. 1
FIG. 2
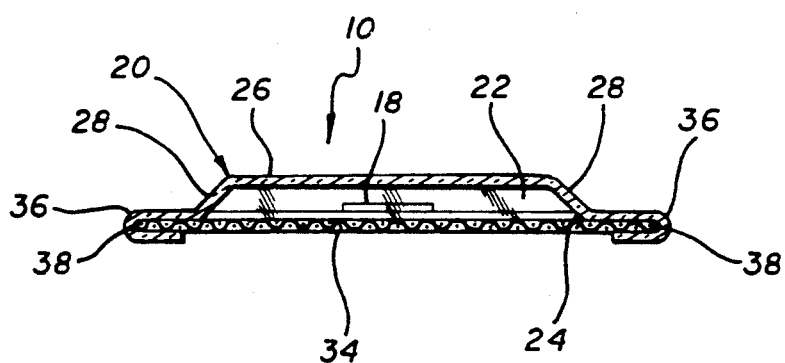
FIG. 3

COMBINATION FLY SWATTER AND INSECT TRAP

BACKGROUND OF THE INVENTION

This invention relates generally to insect traps and fly swatters. More particularly, the present invention relates to a hand held fly swatter apparatus capable of being configured to capture insects alive from given surfaces to allow their subsequent disposal.

Insects have always been pests within a household, and countless devices for trapping, poisoning and/or otherwise destroying them have been devised. Most of such devices are concerned with the wholesale liquidation of all insects in a home; those which are readily seen, such as spiders, flies, gnats, mosquitoes or other flying or crawling varieties, and those which are generally unseen, such as roaches, termites, earwigs, etc.

However, for the occasional spider, earwig, sow bug, or like crawling insect, the only recourse to their capture and/or removal from a household is to first kill them by squashing them with a fly swatter, a rolled-up newspaper, etc., or by stepping on them if the insect is on the floor, and then removing the remains with a piece of paper, tissue or some implement. Such action generally results in the insect being partially or wholly squashed and thus smeared on the ceiling, wall, floor, window, window blinds, etc. The resulting smear is generally very difficult to clean and many times results in permanently staining the area where the insect was destroyed.

There are many persons who prefer not to destroy an insect but would rather capture it alive for subsequent disposal in the outdoors. These people are faced with the sometimes unpleasant, and generally unsuccessful prospect of picking up the insect with their fingers, which could result in a bite or other discomfort, or with some implement which generally results in at least partially maiming the insect.

Other individuals wish only to capture insects in order to study them and free them soon thereafter. It is common practice to capture a specimen by quickly slipping an inverted jar over the same, but it often happens that before the jar is capped the captive escapes. Many devices for capturing insects which overcome this problem are complicated and expensive.

Accordingly, there has been a need for a dual purpose apparatus providing, alternatively, an insect trap and a fly swatter. Such a dual purpose device would eliminate the necessity to have two separate home implements available for dealing with unwanted pests. Further, such an apparatus is needed which is configured to quickly and conveniently capture insects alive from a given surface to allow their subsequent disposal, either by releasing them unharmed or by drowning the pest prior to its release from the apparatus. Additionally, a novel combination fly swatter and insect trap is needed which is of simplified construction, easy to utilize by children and adults alike, sturdy, and which can be utilized as a replacement for the common fly swatter. The present invention fulfills these needs and provides other related advantages.

SUMMARY OF THE INVENTION

The present invention resides in a hand held fly swatter apparatus which is capable of being configured to capture insects alive from given surfaces to allow their subsequent disposal. The combination fly swatter and insect trap comprises, generally, an elongated flexible handle and a rigid housing attached to a front end of the handle, which defines an insect trap compartment having a large aperture through which an insect is placed within the compartment. Means slidable with respect to the handle and the housing, in a plane between a retracted position and an extended position, are provided for covering the insect trap compartment aperture in the extended position, and for uncovering the compartment aperture in the retracted position to permit access to the compartment. The slidable means, in the extended position, and the housing cooperatively provide a fly swatter.

In a preferred form of the invention, the housing is generally transparent and includes an upper wall and interconnected side walls extending downwardly to define the compartment aperture. The upper wall includes a plurality of small apertures which allow air and water to pass, but which are not large enough to permit a roach-sized insect to escape therethrough. The housing further includes a rearwardly extending projection which extends adjacent to a portion of the handle. This rearward housing projection is designed to support a front end portion of the slidable means when placed in its retracted position.

The slidable means comprises a frameless planar mesh closure member. The mesh closure member, which resembles the head of a traditional fly swatter, has a number of small apertures which allow air and water to pass, but which are not large enough to permit a roach-sized insect to escape therethrough. This advantageously allows the user of the combination fly swatter and insect trap to capture an insect and then drown it before disposal.

The housing provides a track positioned adjacent to the compartment aperture for supporting a front end portion of the mesh closure member. The track includes two parallel channels which define two sides of the compartment aperture and extend the length of the housing from a front bumper rearwardly to the rear end of the rearwardly extending projection. The channels are arranged to support the front end portion of the mesh closure member throughout its range of motion between the retracted and extended positions.

A rear slide clamp is attached to a rear end portion of the mesh closure member to provide means for slidably supporting the rear end portion of the mesh closure member relative to the handle. The rear slide clamp includes a central notch through which the handle slidably extends.

Means are provided for limiting the extent of movement of the mesh closure member between the retracted position and the extended position. The closure member movement limiting means includes the housing bumper enclosing a front end of the track to prevent movement of the closure member beyond the front extreme of the compartment aperture. The closure member movement limiting means also includes a rear bumper fixed to the handle to prevent rearward movement of the closure member beyond the retracted position. The rear bumper engages the rear slide clamp when the planar mesh closure member is completely retracted.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 1 is a top, front and right side perspective view of a combination fly swatter and insect trap embodying the invention, wherein the mesh closure member is illustrated in its extended position to close an insect trap compartment;

FIG. 2 is a bottom, rear and right side perspective view of the combination fly swatter and insect trap shown in FIG. 1, illustrating the planar mesh closure member positioned in its retracted position; and FIG. 3 is an enlarged vertical section taken generally along the line 3—3 of FIG. 1, illustrating the manner in which a front end portion of the mesh closure member is captured and slides within a pair of oppositely disposed channels.

DETAILED DESCRIPTION OF THE PREFERRED EMBODIMENT

As shown in the drawings for purposes of illustration, the present invention is concerned with a combination fly swatter and insect trap, generally designated in the accompanying drawings by the reference number 10. The swatter/trap 10 provides a replacement for traditional fly swatters, and is capable of being configured to capture insects 12 alive from given surfaces to allow their subsequent disposal. Alternatively, the insects 12 may be simply crushed by the swatter/trap 10 in a conventional manner, or drowned following capture and prior to disposal.

In accordance with the present invention, the combination fly swatter/insect trap 10 comprises a resiliently flexible handle 14 which has a generally rectangular cross-sectional configuration. The handle 14 has a rear end 16 intended to be grasped by a user, and a front end 18 which supports a rigid housing 20.

The housing 20 is formed of a rigid, light weight transparent material and defines an insect trap compartment 22 having a large aperture 24 through which the insect 12 is placed within the trap compartment. The trap compartment 22 is defined by an upper wall 26 and interconnected side walls 28 which extend downwardly from the upper wall to define the compartment aperture 24. The upper wall 26 itself includes a plurality of small apertures 30 which allow air and water to pass, but which are not large enough to permit the insect 12 to escape therethrough.

Projecting rearwardly from a rear side wall 28 is a housing extension 32. This rearwardly extending housing projection 32, which is integrally formed with the side walls 28 and the upper wall 26, extends beneath a front end portion of the handle 14 to provide additional support for a frameless planar mesh closure member 34.

The housing 20 further includes a pair of parallel channel-like tracks 36 for supporting a front end portion of the mesh closure member 34. The tracks 36, which are parallel to the longitudinal axis of the handle 14, extend the length of the housing 20 and define, in part, two sides of the compartment aperture 24.

The planar mesh closure member 34 resembles the head portion of a traditional fly swatter and includes a number of small apertures which allow air and water to pass, but which are not large enough to permit a roach-sized insect 12 to escape therethrough. Opposite longitudinal edges 38 of the front portion of the closure member 34 are placed within and supported by the tracks 36. When so positioned, the planar mesh closure member 34 is slidable between a retracted position (FIG. 2) to permit access to the insect trap compartment 22 through the compartment aperture 24, and an extended position (FIG. wherein the closure member 34 covers the compartment aperture 24.

A rear slide clamp 40 is attached to a rear end portion of the mesh closure member 34 to slidably support the rear end portion of the closure member relative to the handle 14. In this regard, the rear slide clamp 40 includes a central notch 42 through which the handle 14 slidably extends. The rear slide clamp 40 and the track 36 cooperatively and slidably support the planar mesh closure member 34 relative to the housing 20 and the handle 14.

In order to limit the extent of movement of the mesh closure member 34 between the retracted position and the extended position, front and rear bumpers 44 and 46 are provided. The housing 20 is formed so as to enclose a front end of the tracks 36. This enclosure forms the front bumper 44 to prevent movement of the closure member 34 beyond the front extreme of the compartment aperture 24 as defined by the housing. The rear bumper 46 comprises a stop fixed to an upper surface of the handle 14. The rear bumper 46 is situated and configured to engage the rear slide clamp 40 when the closure member 34 is pulled rearwardly into the retracted position so as to uncover the compartment aperture 24 and yet maintain the front portion of the closure member within the tracks 36 of the rear housing extension 32. The rear bumper 46 prevents rearward movement of the closure member 34 beyond the retracted position.

In use, the apparatus 10 can be utilized as either a fly swatter or as an insect trap. More particularly, when it is desired to utilize the apparatus 10 as a fly swatter, the closure member 34 is placed in the extended position (FIG. 1) so that the compartment aperture 24 is covered. In this configuration, the mesh closure member 34 and the housing 20 cooperatively provide a structure functionally equivalent to the head of a traditional fly swatter. A user would simply grasp the rear end 16 of the handle 14 and swat the pest with the mesh closure member 34 in order to crush it. The mesh construction of the closure member 34 and the small apertures 30 in the upper wall 26 of the housing 20 permit sufficient air passage therethrough that the apparatus 10 provides an effective fly swatter. The upper wall 26 of the housing 20 may have a mesh construction similar to the closure member 34.

Alternatively, when it is desired to capture an insect 12 alive without crushing it, the rear slide clamp 40 is grasped and pulled rearwardly relative to the handle 14 to uncover the trap compartment aperture 24. Typically the closure member 34 is pulled rearwardly until the rear slide clamp 40 engages the rear bumper 46. The housing 20 is then placed over the insect 12 so that the insect is placed within the trap compartment 22 through the large aperture 24. The rear slide clamp 40 is then pushed forwardly to slide the closure member 34 beneath the insect 12 and thus trap it within the compartment 22. Forward movement of the closure member 34 to its extended position is limited by the front bumper 44. With the insect so captured within the trap compartment 22, it can be released outdoors or disposed in any other suitable manner. Advantageously, the construction of the housing 20 and the closure member 34 permit a user to drown the insect 12 in a tank of water, if desired, prior to disposing of the insect.

Although a particular embodiment of the invention has been described in detail for purposes of illustration, various modifications may be made without departing from the spirit and scope of the invention. Accordingly, the invention is not to be limited, except as by the appended claims.

We claim:

1. A hand held fly swatter apparatus capable of being configured to capture insects alive from given surfaces to allow their subsequent disposal, the apparatus comprising:
   an elongate handle having a rear end intended to be grasped by a user, and a front end;
   a rigid housing attached to the front end of the handle and defining an insect trap compartment having a large aperture through which an insect is placed within the insect trap compartment, the housing including an upper wall and interconnected side walls extending downwardly to define the compartment aperture, and a track positioned adjacent to an edge of the compartment aperture;
   a planar mesh closure member supported within the track and slidable between a retracted position to permit access to the insect trap compartment through the compartment aperture, and an extended position wherein the mesh closure member covers the compartment aperture, wherein the housing and the mesh closure member, in its extended position, cooperatively provide a fly swatter; and
   means for slidably supporting a rear end portion of the mesh closure member relative to the handle, including a rear slide clamp attached to the rear end portion of the mesh closure member, having a central notch through which the handle slidably extends.

2. An apparatus as set forth in claim 1, wherein the handle has a generally rectangular cross-sectional configuration and is constructed of a resiliently flexible material.

3. An apparatus as set forth in claim 1, wherein the track comprises two parallel channels which define two sides of the compartment aperture, wherein the channels are arranged to support a front end portion of the mesh closure member throughout its range of motion between the retracted and extended positions.

4. An apparatus as set forth in claim 1, including means for limiting the extent of movement of the mesh closure member between the retracted position and the extended position.

5. An apparatus as set forth in claim 4, wherein the closure member movement limiting means includes a housing bumper enclosing a front end of the track to prevent movement of the closure member beyond the front end of the compartment aperture as defined by the housing.

6. An apparatus as set forth in claim 4, wherein the closure member movement limiting means includes a bumper fixed to the handle to prevent rearward movement of the closure member beyond the retracted position.

7. An apparatus as set forth in claim 1, wherein the housing is generally transparent and the upper wall thereof includes a plurality of small apertures which allow air and water to pass but which are not large enough to permit a roach-sized insect to escape therethrough.

8. An apparatus as set forth in claim 1, wherein the housing includes a projection extending rearwardly from the insect trap compartment, which projection supports a portion of the track designed to support a front end portion of the mesh closure member when place in its retracted position.

9. A dual purpose apparatus providing, alternatively, an insect trap and a fly swatter, the apparatus comprising:
   an elongate, resiliently flexible handle having a rear end intended to be grasped by a user, and a front end;
   a rigid housing attached to the front end of the handle, the housing defining an insect trap compartment having a large aperture through which an insect is placed within the insect trap compartment;
   means slidable with respect to the handle and the housing in a plane between a retracted position and an extended position, for covering the insect trap compartment aperture in the extended position, and for uncovering said compartment aperture in the retracted position to permit access to the insect trap compartment, wherein the slidable means, in the extended position, and the housing cooperatively provide a fly swatter;
   wherein the slidable means comprises a planar mesh closure member, and wherein the housing includes a track for the closure member, the track comprising two parallel channels which define two sides of the compartment aperture, wherein the channels are arranged to support a front end portion of the closure member throughout its range of motion between the retracted and extended positions; and
   a rear slide clamp attached to a rear end portion of the mesh closure member, having a central notch through which the handle slidably extends, which provides means for slidably supporting the rear end portion of the mesh closure member relative to the handle.

10. An apparatus as set forth in claim 9, wherein the housing includes an upper wall and interconnected side walls extending downwardly to define the compartment aperture.

11. An apparatus as set forth in claim 10, wherein the housing further includes a projection extending rearwardly from the insect trap compartment, for supporting a front end portion of the slidable means when placed in its retracted position.

12. An apparatus as set forth in claim 11, wherein the housing is generally transparent and the upper wall thereof includes a plurality of small apertures which allow air and water to pass but which are not large enough to permit a roach-sized insect to escape therethrough.

13. An apparatus as set forth in claim 9, including means for limiting the extent of movement of the mesh closure member between the retracted position and the extended position, wherein the closure member movement limiting means includes a housing bumper enclosing a front end of the track to prevent movement of the closure member beyond a front end of the compartment aperture as defined by the housing, and a rear bumper fixed to the handle and designed to engage the rear slide clamp to prevent rearward movement of the closure member beyond the retracted position.

14. A hand held fly swatter apparatus capable of being configured to capture insects alive from given surfaces to allow their subsequent disposal, the apparatus comprising:

an elongate, resiliently flexible handle of a generally rectangular cross-sectional configuration, having a rear end intended to be grasped by a user, and a front end;

a rigid, generally transparent housing attached to the front end of the handle and defining an insect trap compartment having a large aperture through which an insect is placed within the insect trap compartment, the housing including an upper wall and interconnected side walls extending downwardly to define the compartment aperture, wherein the upper wall includes a plurality of small apertures which allow air and water to pass but which are not large enough to permit a roach-sized insect to escape therethrough, the housing further including a projection which extends rearwardly from a side wall adjacent to the handle;

a track including two parallel channels which define two sides of the compartment aperture, wherein the track is supported by side walls and the rearward projection of the housing;

a planar mesh closure member supported within the track and slidable between a retracted position to permit access to the insect trap compartment through the compartment aperture, and an extended position wherein the mesh closure member covers the compartment aperture, wherein the housing and the mesh closure member, in its extended position, cooperatively provide a fly swatter; and a rear slide clamp attached to a rear end portion of the mesh closure member, having a central notch through which the handle slidably extends, for slidably supporting the rear end portion of the mesh closure member relative to the handle.

15. An apparatus as set forth in claim 14, including means for limiting the extent of movement of the mesh closure member between the retracted position and the extended position.

16. An apparatus as set forth in claim 15, wherein the closure member movement limiting means includes a housing bumper enclosing a front end of the track to prevent movement of the closure member beyond a front end of the compartment aperture as defined by the housing, and a rear bumper affixed to the handle to prevent rearward movement of the closure member beyond the retracted position, the rear bumper being so situated so as to position the front end portion of the mesh closure member within the portion of the track supported by the rear housing projection when the mesh closure member is in its retracted position.

17. A hand held fly swatter apparatus capable of being configured to capture insects alive from given surfaces to allow their subsequent disposal, the apparatus comprising:

an elongate handle having a rear end intended to be grasped by a user, and a front end;

a rigid housing attached to the front end of the handle and defining an insect trap compartment having a large aperture through which an insect is placed within the insect trap compartment, the housing including an upper wall and interconnected side walls extending downwardly to define the compartment aperture, and a track positioned adjacent to an edge of the compartment aperture;

a frameless planar mesh closure member supported within the track and slidable between a retracted position to permit access to the insect trap compartment through the compartment aperture, and an extended position wherein the mesh closure member covers the compartment aperture, wherein the housing and the mesh closure member, in its extended position, cooperatively provide a fly swatter;

a projection extending rearwardly from the insect trap compartment, which projection supports a portion of the track designed to support a front end portion of the mesh closure member when placed in its retracted position; and a rear slide clamp attached to the rear end portion of the mesh closure member, having a central notch through which the handle slidably extends.

18. An apparatus as set forth in claim 17, wherein the track comprises two parallel channels which define two sides of the compartment aperture, wherein the channels are arranged to support a front end portion of the mesh closure member throughout its range of motion between the retracted and extended positions.

19. An apparatus as set forth in claim 17, including a housing bumper enclosing a front end of the track to prevent movement of the closure member beyond the front end of the compartment aperture as defined by the housing, and a bumper fixed to the handle to prevent rearward movement of the closure member beyond the retracted position.

* * * * *